US012633142B2

(12) United States Patent
Kataoka et al.

(10) Patent No.: US 12,633,142 B2
(45) Date of Patent: May 19, 2026

(54) VIDEO DATA GENERATION METHOD AND DEVICE SUPERIMPOSING DRIVER'S FRAME OF VIEW AND TEXT OR ICON INDICATING DRIVER'S MOTION ON VEHICLE EXTERIOR VIDEO

(71) Applicant: DENSO TEN Limited, Kobe (JP)

(72) Inventors: Chiharu Kataoka, Kobe (JP); Yuji Kobayashi, Kobe (JP); Hideaki Miyazaki, Kobe (JP); Osamu Kukimoto, Kobe (JP); Mayu Hatano, Kobe (JP)

(73) Assignee: DENSO TEN Limited, Kobe (JP)

( * ) Notice: Subject to any disclaimer, the term of this patent is extended or adjusted under 35 U.S.C. 154(b) by 109 days.

(21) Appl. No.: 18/613,548

(22) Filed: Mar. 22, 2024

(65) Prior Publication Data

US 2024/0331409 A1    Oct. 3, 2024

(30) Foreign Application Priority Data

Mar. 31, 2023    (JP) ................................. 2023-057993

(51) Int. Cl.
| | |
|---|---|
| *G06V 20/59* | (2022.01) |
| *G06F 3/01* | (2006.01) |
| *G06T 7/246* | (2017.01) |
| *G06T 7/73* | (2017.01) |
| *G06V 20/40* | (2022.01) |
| *G06V 20/56* | (2022.01) |
| *G06V 40/16* | (2022.01) |

(52) U.S. Cl.
CPC ............ *G06V 20/597* (2022.01); *G06F 3/013* (2013.01); *G06T 7/246* (2017.01); *G06T 7/73* (2017.01); *G06V 20/44* (2022.01); *G06V 20/56* (2022.01); *G06V 40/161* (2022.01); *G06V 40/171* (2022.01); *G06V 2201/07* (2022.01)

(58) Field of Classification Search
CPC ..................................................... G06T 7/246
See application file for complete search history.

(56) References Cited

U.S. PATENT DOCUMENTS

| | | | | |
|---|---|---|---|---|
| 2020/0331387 A1* | 10/2020 | Levkova | ............... | B60W 40/09 |
| 2022/0101667 A1* | 3/2022 | Ueda | .................... | G07C 5/0808 |
| 2022/0161654 A1* | 5/2022 | Nakagawa | ............... | H04N 7/18 |

FOREIGN PATENT DOCUMENTS

JP        2009-089022 A      4/2009

* cited by examiner

*Primary Examiner* — Shivang I Patel
(74) *Attorney, Agent, or Firm* — Oliff PLC

(57) ABSTRACT

A generation method by a controller, the generation method includes: acquiring a vehicle interior video from an in-vehicle camera and a vehicle exterior video from an out-vehicle camera; executing a motion analysis of feature points of at least one of a face, an eye, or a hand of a driver based on the vehicle interior video; and generating video data displaying a frame of view of the driver and motion information of the driver superimposed on the vehicle exterior video based on the motion analysis.

14 Claims, 11 Drawing Sheets

| PRIORITIES | ACTION OF DRIVER |
|---|---|
| 1 | DOZING |
| 2 | OPERATING PHONE |
| 3 | LOOKING ASIDE |
| ... | ... |

VIDEO DATA GENERATION METHOD AND DEVICE SUPERIMPOSING DRIVER'S FRAME OF VIEW AND TEXT OR ICON INDICATING DRIVER'S MOTION ON VEHICLE EXTERIOR VIDEO

CROSS-REFERENCE TO RELATED APPLICATIONS

This application is based on and claims priority under 35 USC 119 from Japanese Patent Application No. 2023-57993 filed on Mar. 31, 2023, the entire content of which is incorporated herein by reference.

TECHNICAL FIELD

Embodiments disclosed herein relate to a generation method, a display device, and a generation device.

BACKGROUND ART

There has been known a technique in the related art in which, when a vehicle exterior video acquired by a drive recorder or the like is reproduced, an angle of view of a driver is obtained based on vehicle speed information acquired together with the vehicle exterior video, and a range of view corresponding to the angle of view is displayed together with the vehicle exterior video (for example, refer to JP2009-089022A).

Such a technique in the related art is used to, for example, verify a cause of an accident and a near-miss.

SUMMARY

In the above-described technique, the angle of view is obtained and merely the range of view of the driver is displayed together with the vehicle exterior video.

For this reason, the above-described technique does not allow a viewer of the vehicle exterior video to grasp an actual field of view of the driver or what led the driver to the field of view.

Aspects of the present disclosure relates to providing a generation method, a display device, and a generation device that allow a viewer of a vehicle exterior video to grasp an actual field of view of a driver and what led the driver to the field of view.

According to an aspect of the present disclosure, there is provided a generation method by a controller, the generation method including: acquiring a vehicle interior video from an in-vehicle camera and a vehicle exterior video from an out-vehicle camera; executing a motion analysis of feature points of at least one of a face, an eye, or a hand of a driver based on the vehicle interior video; and generating video data displaying a frame of view of the driver and motion information of the driver superimposed on the vehicle exterior video based on the action analysis.

According to an aspect of the present disclosure, it is possible to allow a viewer of a vehicle exterior video to grasp an actual field of view of a driver and what led the driver to the field of view.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a generation method, a display device, and a generation device disclosed in the present application will be described in detail with reference to the accompanying drawings. The present invention is not limited to the following embodiment.

In the following description, a case in which a generation system according to the embodiment is a teaching material video generation system 1 (see FIG. 1 or the likes) will be described as an example. The teaching material video generation system 1 generates a teaching material video, which is a teaching material for e-learning for safe driving guidance or the like.

In the following description, the generation device according to the embodiment is a server device 100 (see FIG. 1 and the subsequent drawings) provided in the teaching material video generation system 1. The generation method according to the embodiment is a teaching material video generation method executed by the server device 100.

In the following description, expressions "specific", "prescribed", and "constant" may be read as "predetermined".

Figure 1:
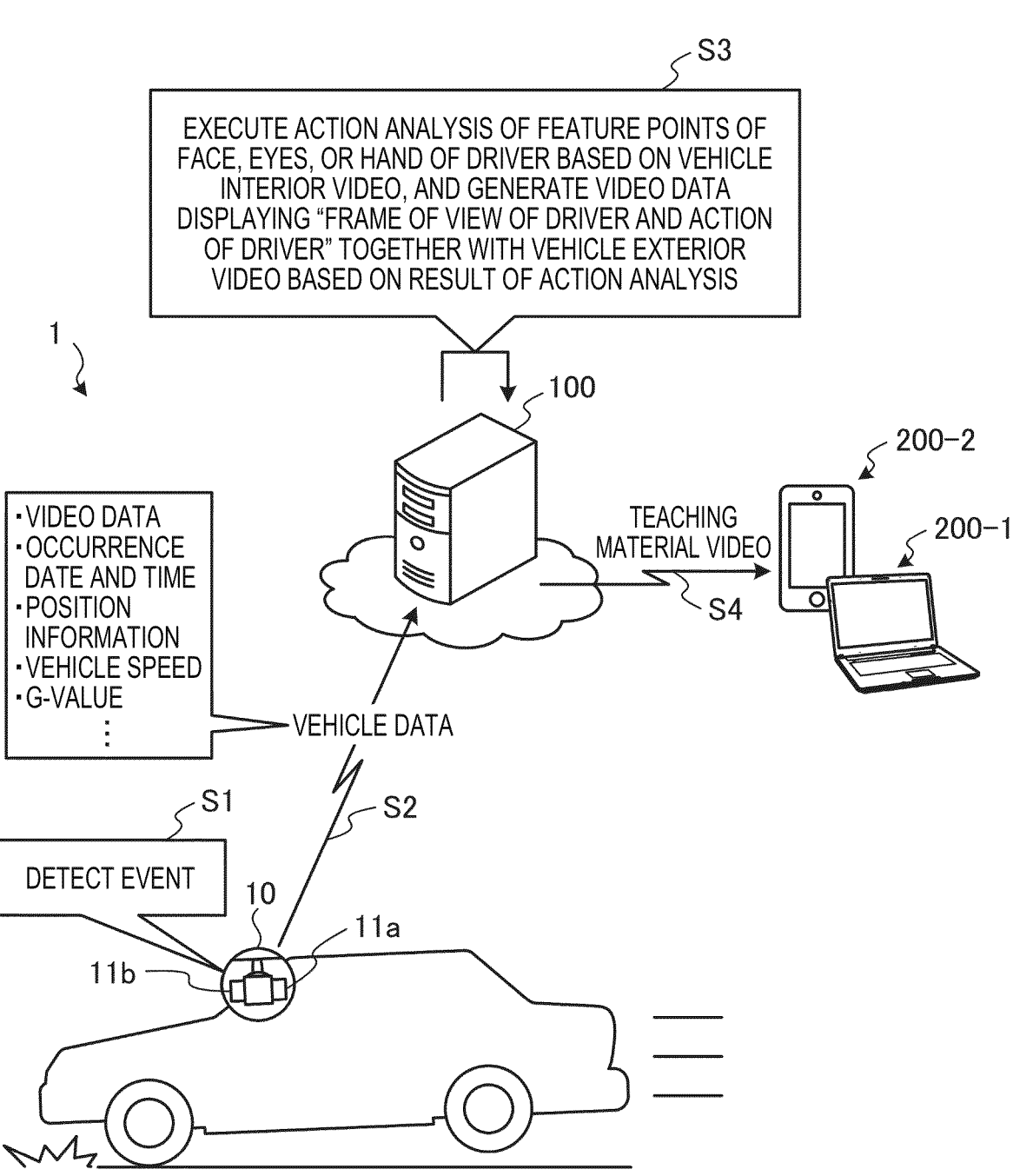
FIG. 1 is a first schematic diagram of a teaching material video generation method according to an embodiment.
Figure 2:
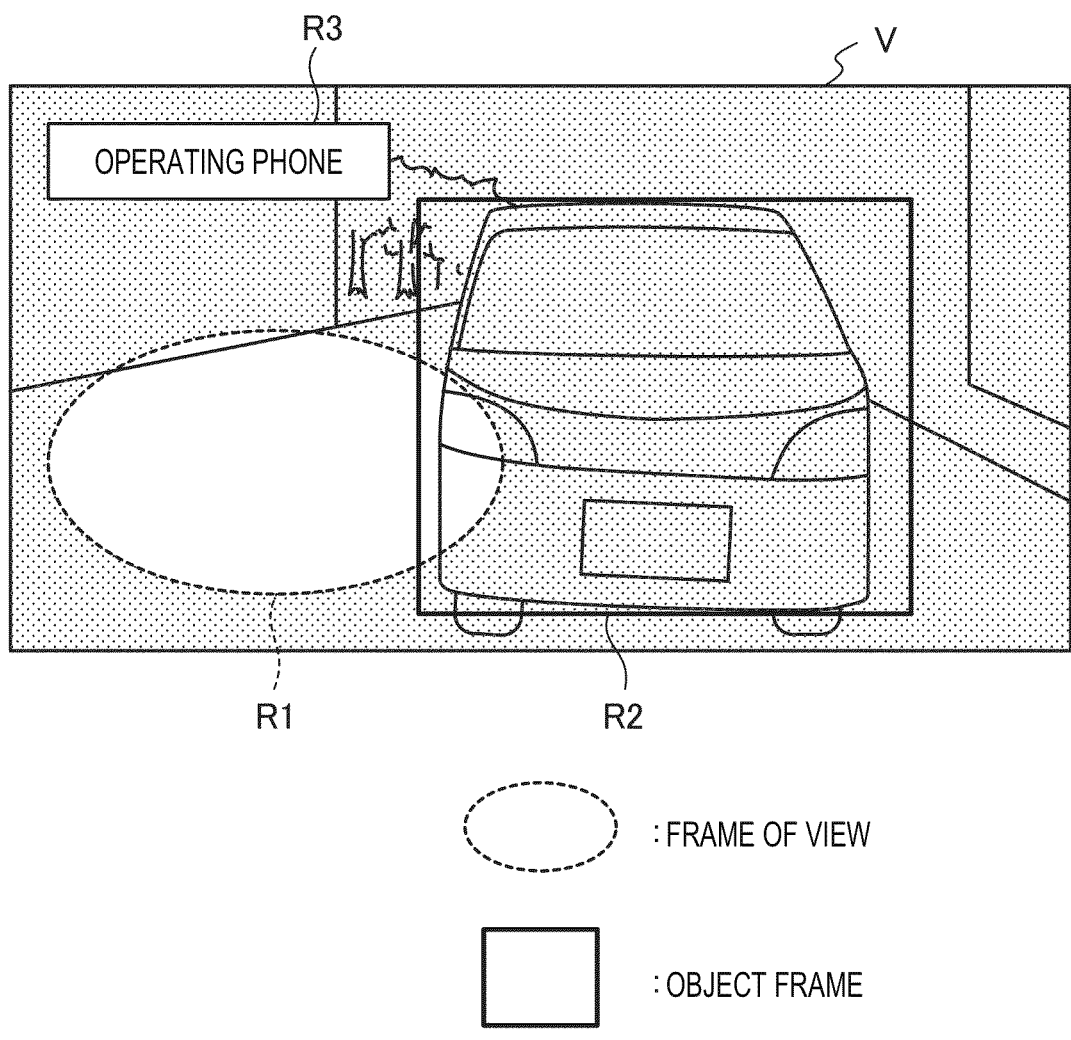
FIG. 2 is a second schematic diagram of the teaching material video generation method according to the embodiment.

First, an outline of the teaching material video generation method according to the embodiment will be described with reference to FIGS. 1 and 2. FIG. 1 is a first schematic diagram of the teaching material video generation method according to the embodiment. FIG. 2 is a second schematic diagram of the teaching material video generation method according to the embodiment.

As shown in FIG. 1, the teaching material video generation system 1 includes a drive recorder 10, the server device 100, and a participating device 200 (200-1, 200-2, . . . ).

The drive recorder 10 is a video recording device mounted on a vehicle. The drive recorder 10 according to the embodiment includes an in-camera 11a and an out-camera 11b. The in-camera 11a and the out-camera 11b are examples of a "camera". The in-camera 11a is configured to capture a vehicle interior video. The out-camera 11b is configured to capture a vehicle exterior video.

When the vehicle is running, the drive recorder 10 records vehicle data, which includes video data captured by the in-camera 11a and the out-camera 11b, in a circular buffer memory in an over-writable manner for a fixed period (for example, 24 hours). The vehicle data may include, in addition to the video data, various types of data indicating a situation of the vehicle such as time information, position information, vehicle speed, and a G-value.

The drive recorder 10 is configured to detect a specific event such as an accident and a near-miss. The drive recorder 10 detects the specific event when a change in the vehicle speed, a change in the G-value and the like satisfy prescribed event conditions corresponding to an accident, a near-miss and the like that are set in advance.

When detecting the specific event, the drive recorder 10 sets vehicle data for a prescribed period before and after a detection time point to be overwrite-prohibited. Alternatively, the drive recorder 10 records the vehicle data for the prescribed period before and after the detection time point in another recording medium. The overwrite-prohibition process and the recording process on another recording medium may be executed in response to instructions from the server device 100.

When detecting the specific event, the drive recorder 10 transmits the vehicle data set to be overwrite-prohibited to the server device 100.

The server device 100 is provided to analyze the situation of the vehicle when the specific event such as an accident and a near-miss is detected based on the vehicle data transmitted from the vehicle. The server device 100 is configured to generate a teaching material video based on an analysis result.

The server device 100 is further configured to provide a service of delivering the generated teaching material video to the participating device 200. The participating device 200 is a terminal device used by a participant (corresponding to an example of a "viewer") participating in e-learning. The participating device 200 is implemented by a personal computer (PC) such as the participating device 200-1 or a smartphone such as the participating device 200-2.

There has been a technique in which an angle of view of a driver is obtained based on vehicle speed acquired together with video data from the drive recorder 10 and a range of view corresponding to the angle of view is displayed together with a vehicle exterior video. Here, a case of using the technique in the related art to generate a teaching material video is considered.

However, in the above-mentioned technique, the range of view, which is defined by a correspondence map indicating a correspondence relation between the speed and the angle of view defined in advance, is merely displayed together with the vehicle exterior video.

The teaching material video generated using the above-mentioned technique cannot have the participant grasp an actual field of view of the driver and what led the driver to the field of view. Specifically, the participant cannot grasp whether a cause of an accident, a near-miss and the like is dozing, operating smartphone (hereinafter referred to as "phone"), looking aside or the like.

This is not limited to the case in which the participant views the teaching material video, and the same applies to a case in which a person in charge of analyzing a situation of a vehicle during an event (corresponding to an example of the "viewer") views a verification video generated using the technology in the related art.

In the teaching material video generation method according to the embodiment, the server device 100 (corresponding to an example of a "generation device") acquires the vehicle interior video and the vehicle exterior video from the in-camera 11a and the out-camera 11b.

The server device 100 further executes an action analysis of feature points of a face, eyes, or a hand of the driver based on the vehicle interior video, and generates video data displaying a frame of view of the driver and an action of the driver together with the vehicle exterior video based on a result of the action analysis.

Specifically, as shown in FIG. 1, when detecting a specific event based on an event condition set in advance (step S1), the drive recorder first transmits vehicle data for a constant period before and after an event detection time point to the server device 100 (step S2). As described above, the vehicle data includes video data, time information (occurrence date and time), position information, vehicle speed, G-value, and the like.

The server device 100 then executes an action analysis of the feature points of the face, the eyes, or the hand of the driver based on the vehicle interior video captured by the in-camera 11a, and generates video data displaying the frame of view of the driver and the action of the driver together with the vehicle exterior video based on a result of the action analysis (step S3).

Specifically, as shown in FIG. 2, the teaching material video is generated in a manner of displaying a frame of view R1, an object frame R2, and an action display area R3 together with a vehicle exterior video V by the out-camera 11b.

The frame of view R1 is a detection frame indicating an actual field of view of the driver. The frame of view R1 is superimposed and displayed on the vehicle exterior video V, so that the participant may clearly grasp the actual field of view of the driver. A position, a size, a shape, and the like of the frame of view R1 are estimated by analyzing, by the server device 100, the vehicle interior video captured by the in-camera 11a using, for example, an artificial intelligence (AI) model for image recognition.

The server device 100 recognizes the face of the driver or an object other than the face from the vehicle interior video using, for example, the AI model. Further, the server device 100 extracts, for example, the feature points of the face from the recognized face. The server device 100 estimates an orientation of the face of the driver, an eye open state of the driver and the like based on, for example, positions of the extracted feature points of the face. The eye open state of the driver means an opened and closed state of eyelids of the driver. Then, the server device 100 estimates the frame of view R1 based on an estimation result.

The server device 100 estimates a position of the frame of view R1 displayed on the vehicle exterior video V according to, for example, the estimated orientation of the face of the driver. Accordingly, the server device 100 may display the frame of view R1 in a position close to the actual field of view according to the orientation of the face of the driver. The server device 100 estimates the size of the frame of view R1 displayed on the vehicle exterior video V according to, for example, the estimated eye open state of the driver. Accordingly, the server device 100 may display the frame of view R1 having a size close to the actual field of view according to the eye open state of the driver. In FIG. 2, the frame of view R1 is shown in an elliptical shape, and a shape of the frame of view R1 is not limited.

Further, when estimating that the estimated position of the frame of view R1 is outside an imaging range of the vehicle exterior video V, for example, the server device 100 does not display the frame of view R1 on the vehicle exterior video V. Further, when estimating that the eyes are closed based on the estimated eye open state, for example, the server device 100 does not display the frame of view R1 on the vehicle exterior video V.

In this manner, the server device 100 may generate a teaching material video in which display control of switching the display and non-display of the frame of view R1 is executed according to the orientation of the face of the driver, the eye open state and the like. The participant may easily grasp the actual field of view of the driver by viewing the teaching material video in which the display control is executed such that the display and non-display of the frame of view R1 is switched.

The object frame R2 is a detection frame for an object in an accident, a near-miss and the like. The object frame R2 is estimated by analyzing, by the server device 100, the vehicle exterior video V captured by the out-camera 11b using, for example, the above-described AI model.

The object frame R2 is superimposed and displayed on the vehicle exterior video V, so that the participant may easily grasp the object in the accident, the near-miss and the like.

The action display area R3 is a display area for an action (may also be read as "state") of the driver. The action of the driver displayed in the action display area R3 is estimated by the server device 100 based on an object other than the face, the orientation of the face, the eye open state, and the like recognized from the vehicle interior video captured by the in-camera 11a.

The object other than the face is, for example, the hands of the driver or a smartphone. The action of the driver is, for example, "dozing", "operating phone", or "looking aside". "Operating phone" corresponds to an example of an "operation while driving", which involves operating an object such as a phone or a car navigation system during driving. The server device 100 generates the action display area R3 in a manner of displaying the action of the driver in, for example, text information. FIG. 2 shows an example in which "operating phone" is displayed in text information in the action display area R3.

Since the action of the driver is displayed in text information in the action display area R3, the participant may easily grasp the action of the driver during the accident, the near-miss and the like. Further, since the display control of displaying and not displaying the frame of view R1 is executed together with the display of the action display area R3, the participant may easily grasp the actual field of view of the driver and what led the driver to the field of view during the accident, the near-miss and the like.

As shown in FIG. 2, the frame of view R1 is preferably subjected to image processing such that, for example, brightness and transparency in the frame of view R1 are higher than those in a region other than the frame of view R1 of the vehicle exterior video V. That is, the image processing is preferably executed such that visibility of the frame of view R1 is higher than that of the other region of the vehicle exterior video V. Accordingly, the participant may clearly distinguish and grasp the actual field of view of the driver from the other region.

The action display area R3 may also display the action of the driver in a manner of processing a background to be transparent and directly superimposing the text information indicating the action of the driver on the vehicle exterior video V. In addition, the action display area R3 is not limited to displaying the action of the driver in text information, and may also display the action of the driver in a prescribed icon (including a symbol, a mark, and the like) indicating the action of the driver.

Description is referred back to FIG. 1. Then, the server device 100 delivers the generated teaching material video to the participating device 200 (step S4). When viewing the teaching material video delivered to the participating device 200, the participant grasps the actual field of view of the driver and the action of the driver leading to the field of view in a scene of a teaching material of safe driving guidance or the like.

In this manner, in the teaching material video generation method according to the embodiment, the server device 100 acquires the vehicle interior video captured by the in-camera 11a and the vehicle exterior video captured by the out-camera 11b, and executes the action analysis of the feature points of the face, the eyes, or the hand of the driver based on the vehicle interior video. Further, the server device 100 generates video data displaying the frame of view of the driver and the action of the driver together with the vehicle exterior video based on a result of the action analysis.

According to the teaching material video generation method according to the embodiment, the viewer of the vehicle exterior video V may grasp the actual field of view of the driver and what led the driver to the field of view.

Hereinafter, a configuration example of the teaching material video generation system 1 including the drive recorder 10 to which the teaching material video generation method according to the above-described embodiment is applied will be described more specifically.

Figure 3:
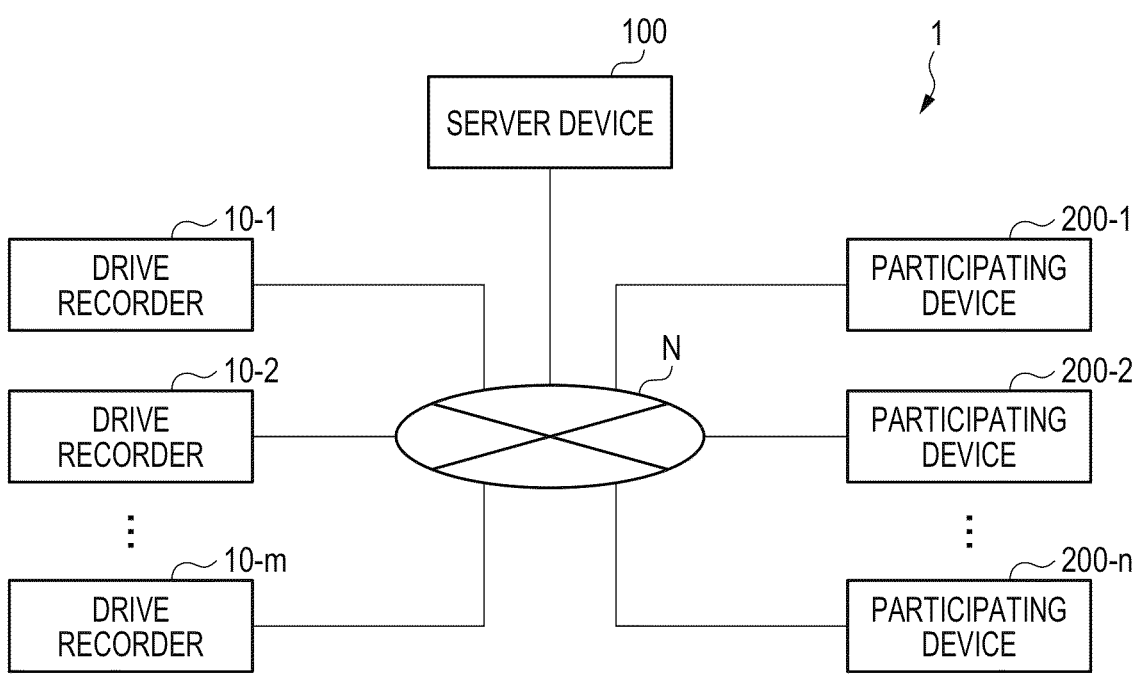
FIG. 3 shows a configuration example of a teaching material video generation system according to the embodiment.

FIG. 3 shows a configuration example of the teaching material video generation system 1 according to the embodiment. As shown in FIG. 3, the teaching material video generation system 1 includes one or more drive recorders 10-1, 10-2, . . . 10-m (m is a natural number), the server device 100, and one or more participating devices 200-1, 200-2, . . . 200-n (n is a natural number).

The drive recorder 10, the server device 100, and the participating device 200 are communicably connected via a network N such as the Internet, a mobile phone line network, or a cellular vehicle to everything (C-V2X) communication network.

As described above, the drive recorder 10 records vehicle data, which includes vehicle interior and exterior video data captured by the in-camera 11a and the out-camera 11b and various types of data indicating a situation of the vehicle, in a circular buffer memory in an over-writable manner for a predetermined period.

When detecting a specific event such as an accident and a near-miss during running of the vehicle, the drive recorder 10 sets vehicle data for a prescribed period before and after a detection time point to be overwrite-prohibited. Alternatively, the drive recorder 10 records the vehicle data for the prescribed period before and after the detection time point in another recording medium.

When detecting the specific event, the drive recorder 10 transmits the vehicle data set to be overwrite-prohibited to the server device 100.

The server device 100 is implemented as, for example, a cloud server. The server device 100 is managed by, for example, a company who runs the teaching material video generation system 1. The server device 100 collects vehicle data transmitted from the drive recorder 10.

The server device 100 analyzes the field of view and the action of the driver based on the vehicle interior video by the in-camera 11a using the collected vehicle data, and generates a teaching material video displaying the field of view of the driver and the action of the driver together on the vehicle exterior video V captured by the out-camera 11b.

The server device 100 accumulates and manages a generated teaching material video group. The server device 100 provides a service of delivering the teaching material video to the participating device 200.

As described above, the participating device 200 is a terminal device used by the participant, and is implemented by a PC, a smartphone, or the like. The participating device 200 may be implemented by a tablet terminal, a wearable device, or the like.

Figure 4:
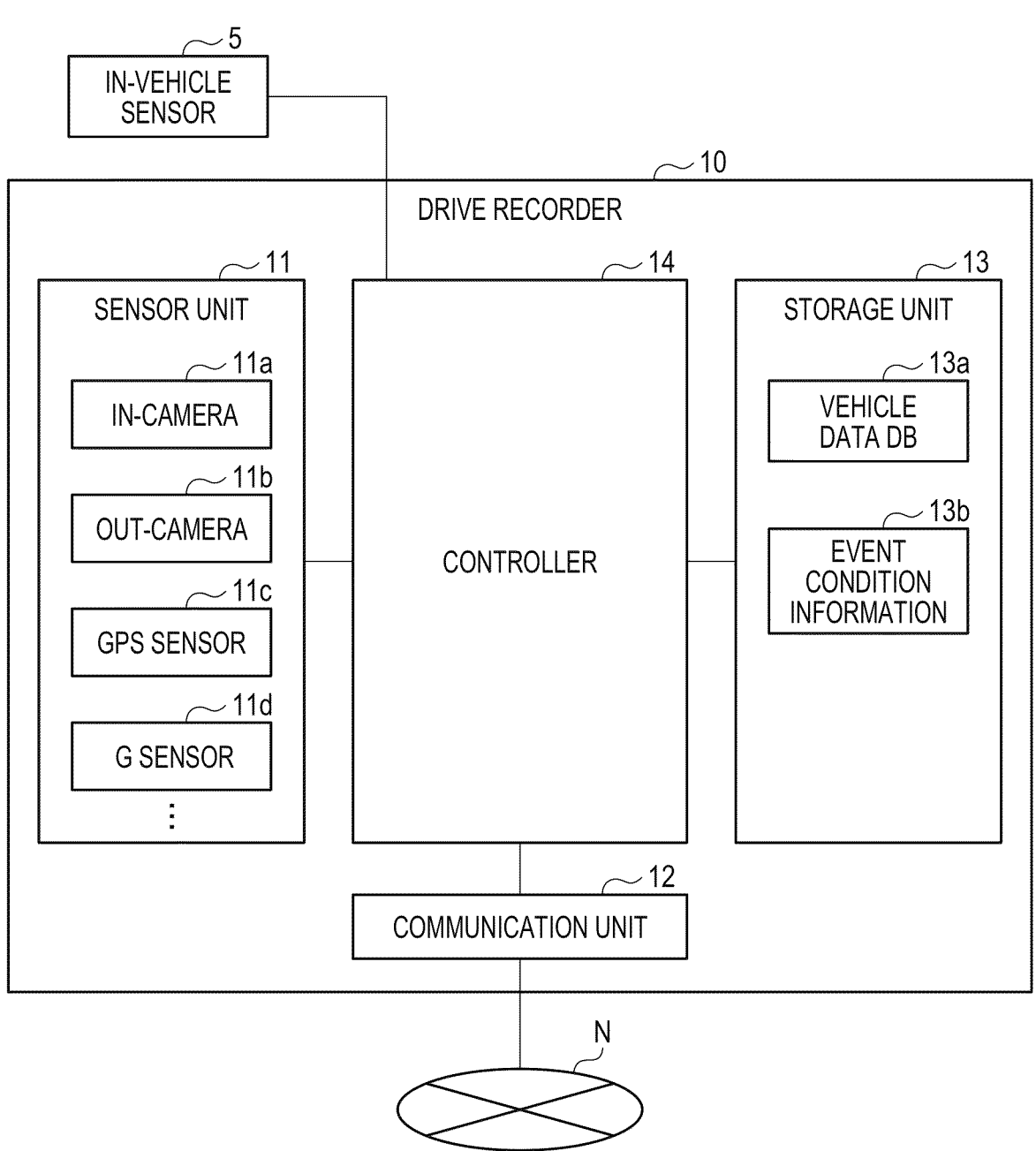
FIG. 4 shows a configuration example of a drive recorder according to the embodiment.

Next, a configuration example of the drive recorder 10 will be described. FIG. 4 shows a configuration example of the drive recorder 10 according to the embodiment. As shown in FIG. 4, the drive recorder 10 includes a sensor unit 11, a communication unit 12, a storage unit 13, and a controller 14.

The sensor unit 11 is a group of various types of sensors mounted on the drive recorder 10. The sensor unit 11 includes, for example, the in-camera 11a, the out-camera 11b, a global positioning system (GPS) sensor 11c, and a G sensor 11d.

The in-camera 11a is configured to capture a vehicle interior video. The in-camera 11a is attached in a vicinity of a windshield, a dashboard, or the like such that at least the face of the driver is included in the imaging range.

The out-camera 11b is provided such that vehicle exterior video V is able to be captured. The out-camera 11b is attached in a vicinity of the windshield, the dashboard, a rear window, or the like. The in-camera 11a and the out-camera 11b do not necessarily be separated from each other, and may be integrally implemented by a 360-degree camera, for example.

The GPS sensor 11c measures a GPS position of the vehicle. The G sensor 11d measures an acceleration applied to the vehicle.

In addition to the sensor unit 11, the drive recorder 10 is further connected to an in-vehicle sensor 5 which is a group of various types of sensors mounted on the vehicle. The in-vehicle sensor 5 includes, for example, a vehicle speed sensor, an accelerator sensor, and a brake sensor. The in-vehicle sensor 5 is connected to the drive recorder 10 via an in-vehicle network such as a controller area network (CAN).

The communication unit 12 is implemented by a network adapter or the like. The communication unit 12 is wirelessly connected to the network N and transmits and receives information to and from the server device 100 via the network N.

The storage unit 13 is implemented by a storage device such as a read only memory (ROM), a random access memory (RAM), or a flash memory. In the example of FIG. 4, the storage unit 13 stores a vehicle data DB 13a and event condition information 13b.

The vehicle data DB 13a is a database of vehicle data recorded by the drive recorder 10. The event condition information 13b is information in which prescribed event conditions for detecting the above-described specific event are set in advance.

The controller 14 corresponds to a so-called processor. The controller 14 is implemented by a central processing unit (CPU), a micro processing unit (MPU), a graphic processing unit (GPU), or the like. The controller 14 executes a program (not shown) according to the embodiment stored in the storage unit 13 using the RAM as a work area. The controller 14 may be implemented by an integrated circuit such as an application specific integrated circuit (ASIC) or a field programmable gate array (FPGA).

Figure 8:
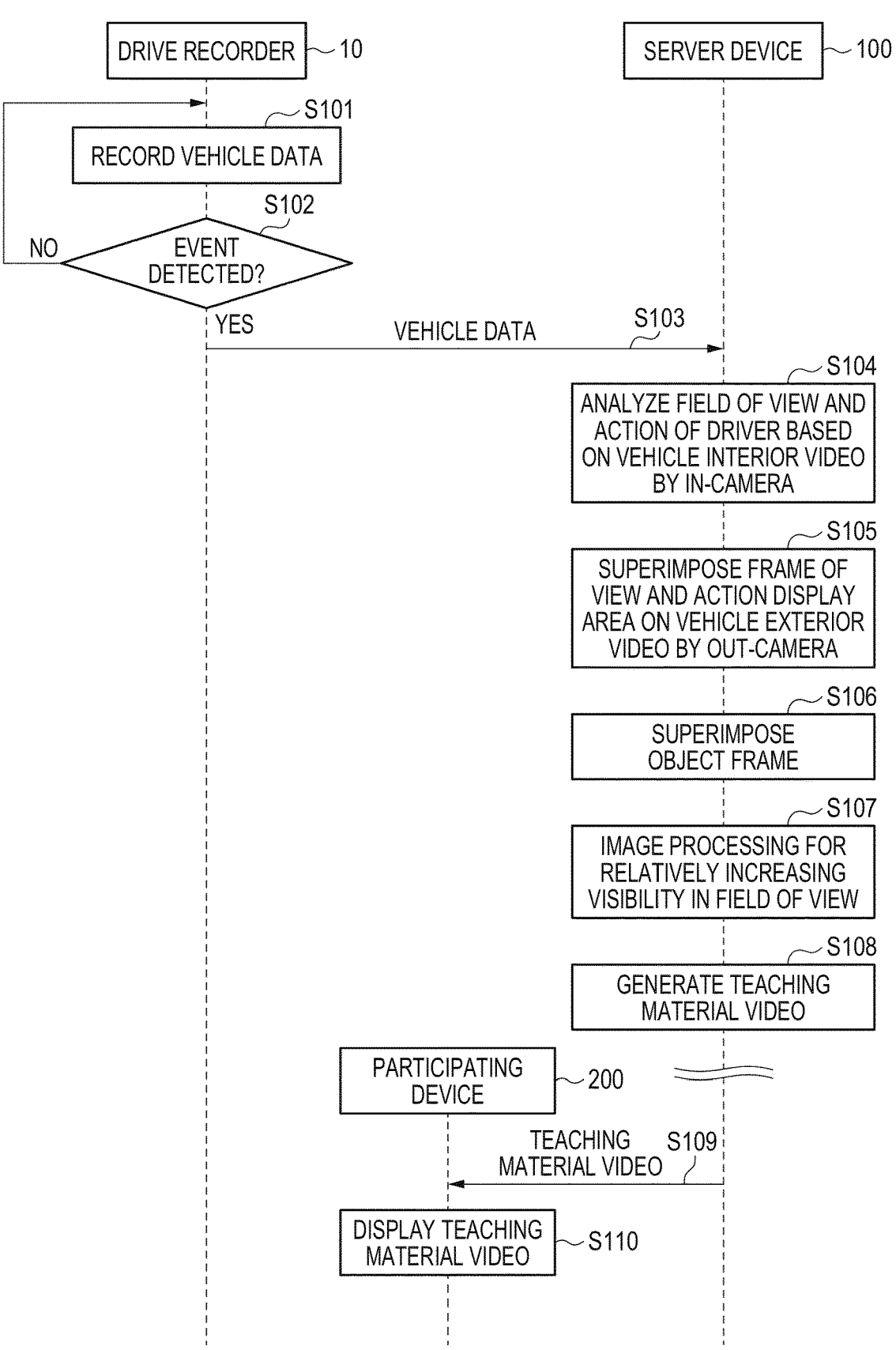
FIG. 8 shows a processing sequence executed by the teaching material video generation system according to the embodiment.

The controller 14 executes information processing according to a processing sequence shown in FIG. 8. Description will be given later using FIG. 8.

Figures 5, 6:
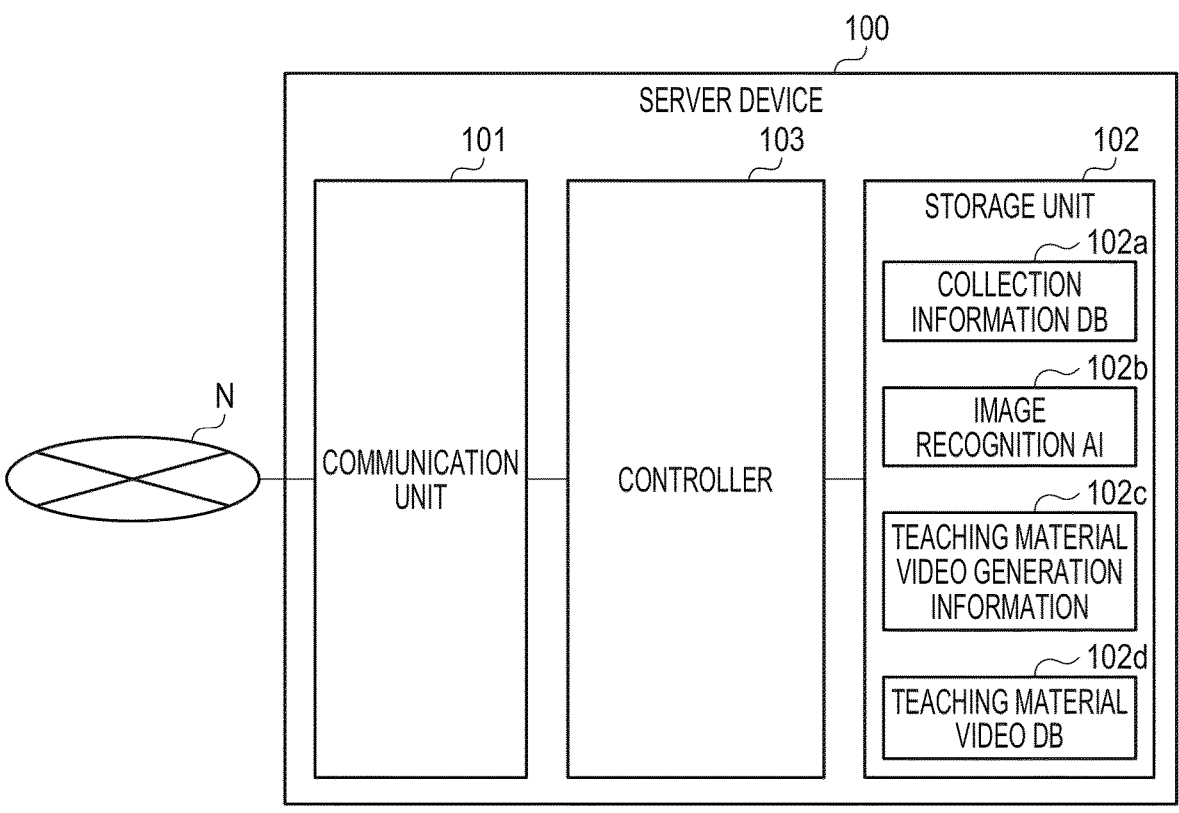
FIG. 5 shows a configuration example of a server device according to the embodiment.
FIG. 6 shows an example of priorities of actions of a driver contained in teaching material video generation information.

Next, a configuration example of the server device 100 will be described. FIG. 5 shows a configuration example of the server device 100 according to the embodiment. As shown in FIG. 5, the server device 100 includes a communication unit 101, a storage unit 102, and a controller 103.

The communication unit 101 is implemented by a network adapter or the like. The communication unit 101 is connected to the network N in a wired or wireless manner, and transmits and receives information to and from the drive recorder 10 and the participating device 200 via the network N.

The storage unit 102 is implemented by a storage device such as a ROM, a RAM, a flash memory, and a hard disk drive (HDD). In the example of FIG. 5, the storage unit 102 stores a collected information DB 102a, an image recognition AI 102b, teaching material video generation information 102c, and a teaching material video DB 102d.

The collected information DB 102a is a database in which vehicle data collected from the drive recorder 10 is stored. The image recognition AI 102b is an AI model for image recognition. The image recognition AI 102b is a deep neural network model (DNN) trained using, for example, a machine learning algorithm.

The image recognition AI 102b is configured to distinguish various types of objects included in a frame image of video data when the frame image is input to the controller 103 after being read as the DNN model in the controller 103.

The image recognition AI 102b is configured to detect, for example, a face of a person captured in a frame image of the vehicle interior video when the frame image is input.

In addition, the image recognition AI 102b is configured to extract a feature point group of the face in a face detection frame. The image recognition AI 102b is configured to detect an object other than a face. The object other than the face is the hands, the phone, or the like of the driver as described above.

The teaching material video generation information 102c is information in which various types of parameters used when the controller 103 generates a teaching material video are set. The various types of parameters include, for example, parameters related to a screen layout in the teaching material video. The various types of parameters further include parameters related to priorities of actions of the driver displayed in the action display area R3.

FIG. 6 shows an example of the priorities of the actions of the driver contained in the teaching material video generation information 102c. The actions of the driver, that is, "operating phone", "dozing", "looking aside", and the like may occur at the same time. For example, "looking aside" may occur at the same time as "operating phone". This is an action that hinders safe driving or an action leading to a traffic violation.

The above-described priorities of the actions of the driver mean an order indicating which action is preferentially displayed as text information in the action display area R3 when these actions occur at the same time. As shown in FIG. 6, the priorities are set such that, for example, a first place is "dozing", a second place is "operating phone", and a third place is "looking aside".

According to the example of FIG. 6, when estimating that the above-described "looking aside" and "operating phone" occur at the same time, the server device 100 generates a teaching material video in a manner of displaying text information of "operating phone" in the action display area R3. Accordingly, it is possible to preferentially display, for example, the action of the driver that is highlighted as having a higher degree of risk to the participant in the safe driving guidance in the action display area R3 by setting of the teaching material video generation information 102c.

Description is referred back to FIG. 5. The teaching material video DB 102d is a database in which a teaching material video generated by the controller 103 is stored.

The controller 103 corresponds to a so-called processor. The controller 103 is implemented by a CPU, an MPU, a GPU, or the like. The controller 103 executes a program (not shown) according to the embodiment stored in the storage unit 102 using the RAM as a work area. The controller 103 may be implemented by an integrated circuit such as an ASIC or an FPGA.

Similar to the controller 14 described above, the controller 103 executes information processing according to the processing sequence shown in FIG. 8. Description will be given later using FIG. 8.

Figure 7:
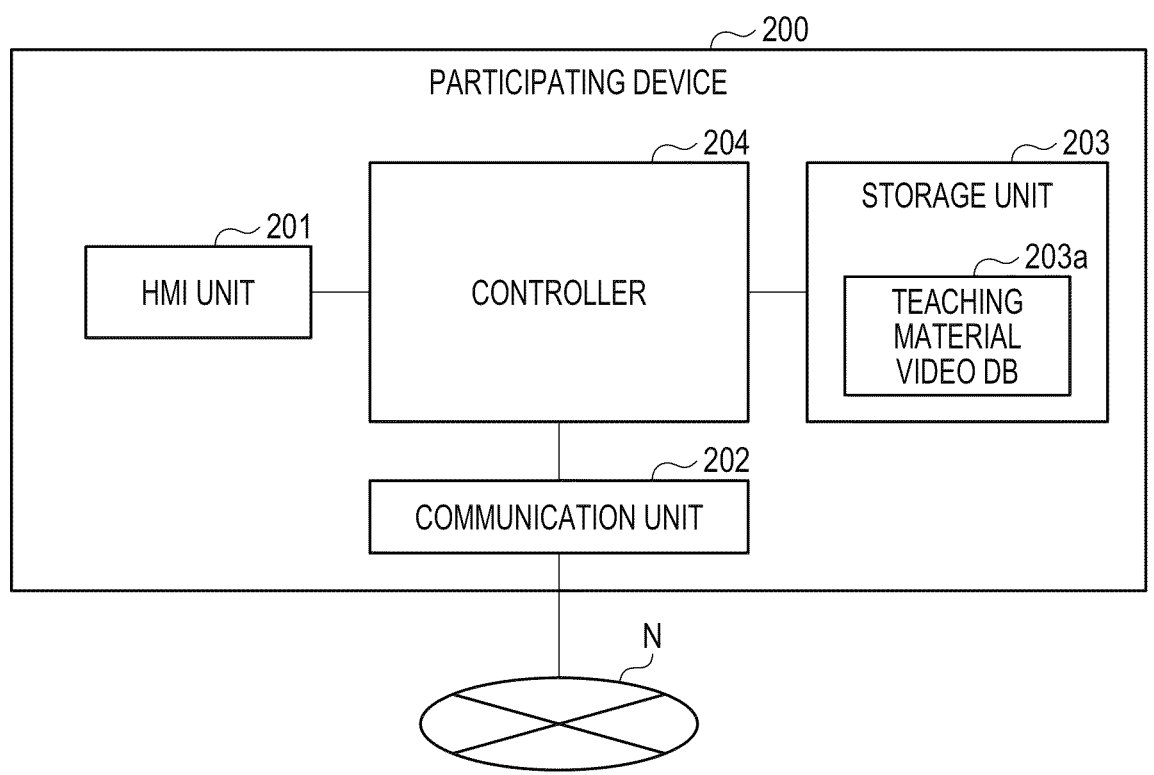
FIG. 7 shows a configuration example of a participating device according to the embodiment.

Next, a configuration example of the participating device 200 will be described. FIG. 7 shows the configuration example of the participating device 200 according to the embodiment. As shown in FIG. 7, the participating device 200 includes a human machine interface (HMI) unit 201, a communication unit 202, a storage unit 203, and a controller 204.

The HMI unit 201 is a component that provides an interface component related to input and output to and from the participant. The HMI unit 201 includes an input interface that receives an input operation from a user. The input interface is implemented by, for example, a touch panel. The input interface may be implemented by a keyboard, a mouse, a pen tablet, a microphone, or the like. The input interface may be implemented by a software component.

The HMI unit 201 includes an output interface that presents image information and audio information to the participant. The output interface is implemented by, for example, a display or a speaker. The HMI unit 201 may integrally provide the input interface and the output interface to the participant by, for example, a touch panel display.

The communication unit 202 is implemented by a network adapter or the like. The communication unit 202 is connected to the network N in a wired or wireless manner, and transmits and receives information to and from the server device 100 via the network N.

The storage unit 203 is implemented by a storage device such as a ROM, a RAM, a flash memory, or an HDD. In the example of FIG. 7, the storage unit 203 stores a teaching material video DB 203a.

The teaching material video DB 203a is a database in which a teaching material video received by the controller 204 from the server device 100 via the communication unit 202 is stored.

The controller 204 corresponds to a so-called processor. The controller 204 is implemented by a CPU, an MPU, a GPU, or the like. The controller 204 executes a program (not shown) according to the embodiment stored in the storage unit 203 using the RAM as a work area. The controller 204 may be implemented by an integrated circuit such as an ASIC or an FPGA.

Similar to the controller 14 and the controller 103 described above, the controller 204 executes information processing according to the processing sequence shown in FIG. 8.

Next, information processing according to the processing sequence will be described. FIG. 8 shows a processing sequence executed by the teaching material video generation system 1 according to the embodiment.

In the drive recorder 10, the controller 14 records vehicle data (step S101). The controller 14 determines whether a specific event is detected (step S102).

When the specific event is detected (step S102, Yes), the controller 14 transmits vehicle data for a prescribed period before and after an event detection time point to the server device 100 (step S103). In a case where the specific event is not detected (step S102, No), the controller 14 repeats the processing from step S101.

The controller 103 of the server device 100 analyzes the field of view and the action of the driver based on the vehicle interior video by the in-camera 11a of the vehicle data acquired in step S103 (step S104). The controller 103 estimates the field of view and the action of the driver from an analysis result.

Figure 9:
FIG. 9 shows the first example of an analysis process of a field of view and an action of a driver.
Figure 10:
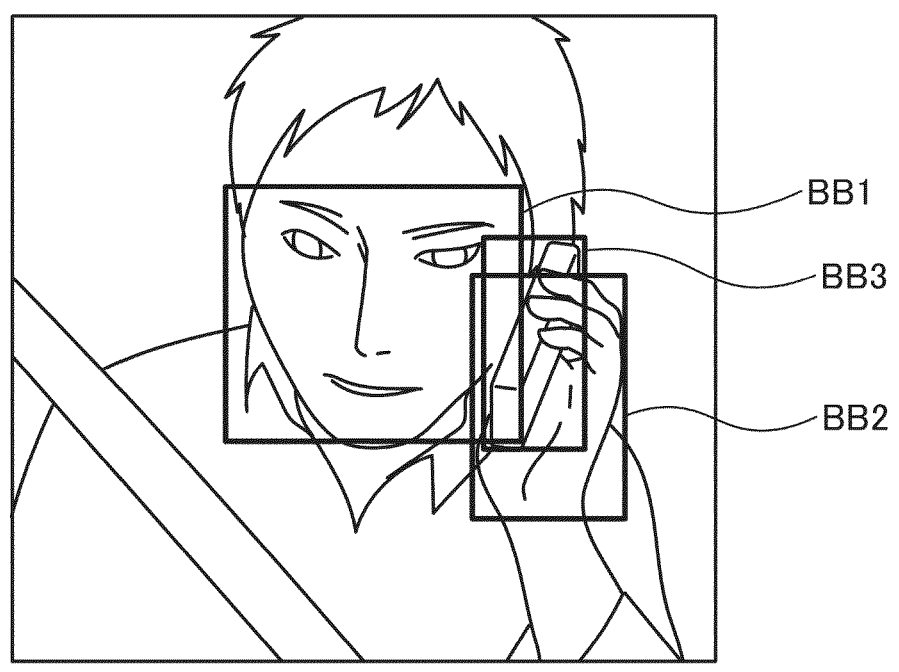
FIG. 10 shows the second example of the analysis process of the field of view and the action of the driver.
Figure 11:
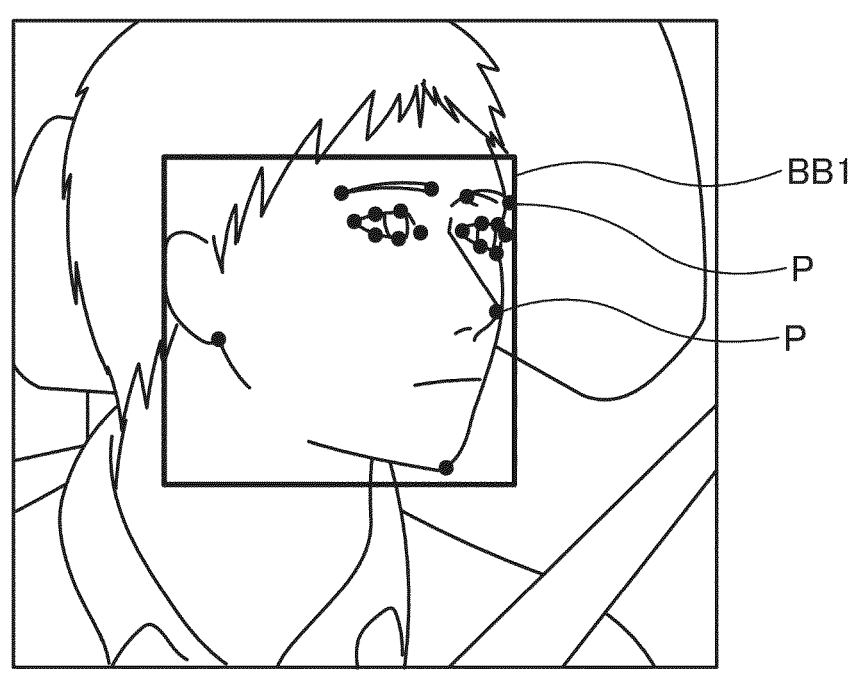
FIG. 11 shows the third example of the analysis process of the field of view and the action of the driver.

Here, an example of a process of analyzing the field of view and the action of the driver executed by the controller 103 will be described with reference to FIGS. 9 to 11. FIG. 9 shows a first example of the process of analyzing the field of view and the action of the driver. FIG. 10 shows a second example of the process of analyzing the field of view and the action of the driver. FIG. 11 shows a third example of the process of analyzing the field of view and the action of the driver.

The controller 103 detects, for example, the face of the driver as shown in a detection frame BB1 in FIG. 9 using the image recognition AI 102b. The controller 103 further extracts a group of feature points P of the face in the detection frame BB1.

The controller 103 extracts the group of feature points P at, for example, a tip of chin, a tip of nose, ends of eyebrows, and outlines of eyes of the driver. Then, the controller 103 estimates the eye open state from arrangements of the group of feature points P at the outlines of eyes. For example, when determining that the eyes of the driver are continuously closed over a prescribed number of frame images based on the estimated eye open state, the controller 103 estimates that the action of the driver is "dozing". Accordingly, the controller 103 may determine the action of "dozing" based on image recognition of the vehicle interior video captured by the in-camera 11a.

The controller 103 further detects, for example, the face of the driver as shown in the detection frame BB1 in FIG. 10 using the image recognition AI 102b. The controller 103 further detects the hand of the driver in a detection frame BB2. The controller 103 further detects the phone in a detection frame BB3.

Then, the controller 103 determines whether the driver is using the phone based on, for example, an arrangement relation of the detection frames BB1 to BB3. When determining that the driver is using the phone, the controller 103 estimates that the action of the driver is "operating phone". Accordingly, the controller 103 may determine the "operation while driving" based on image recognition of the vehicle interior video by the in-camera 11a.

The controller 103 further detects, for example, the face of the driver as shown in the detection frame BB1 in FIG. 11 using the image recognition AI 102b. The controller 103 further extracts a group of feature points P of the face in the detection frame BB1.

Then, the controller 103 estimates a three-dimensional position and posture of the face of the driver as an orientation of the face based on arrangements of the extracted group of feature points P. Specifically, the position and posture of the face is the position and posture of a specific part (for example, between eyebrows) of the face.

Based on the arrangements of the group of feature points P, the controller 103 estimates, as the position and posture of the face, a roll angle, a pitch angle, and a yaw angle on three orthogonal axes that take a center of the specific part on a median plane of the driver as an origin, for example. Then, the controller 103 estimates a sightline direction of the driver as a three-dimensional vector corresponding to the estimated position and posture of the face. Accordingly, the controller 103 may estimate the sightline direction with high accuracy based on the position and posture of the face.

Then, the controller 103 projects the estimated sightline direction onto the imaging range of the vehicle exterior video V captured by the out-camera 11b, and estimates the field of view of the driver on the vehicle exterior video V based on the projection result. At this time, the estimation may also be executed in consideration of not only the sightline direction but also vehicle speed or the like.

In the example of FIG. 11, the group of feature points P are unevenly distributed to right in the detection frame BB1, and thus the controller 103 estimates the position and posture of the face facing leftward from front, and estimates the sightline direction to left as a three-dimensional vector corresponding to the position and posture. That is, the controller 103 determines whether the action of the driver is "looking aside" based on the orientation of the face of the driver. Accordingly, the controller 103 may determine "looking aside" based on image recognition of the vehicle interior video captured by the in-camera 11a. In the example of FIG. 11, the controller 103 estimates that the action of the driver is "looking aside".

As described with reference to FIGS. 9 to 11, the controller 103 estimates the action of the driver based on the face of the driver, the hand of the driver, and the object detected by image recognition. Accordingly, the controller 103 may determine the action of the driver displayed in the action display area R3 based on image recognition of the vehicle interior video captured by the in-camera 11a.

In addition to the examples described with reference to FIGS. 9 to 11, the controller 103 may estimate the sightline direction of the driver, the orientation of the face, the eye open state, and the like by using an infrared image. In this case, the drive recorder 10 includes an infrared light emitting diode (LED) that emits infrared light to the face of the driver. The in-camera 11a includes an infrared camera. The infrared camera is available to capture an infrared image of the face of the driver irradiated with the infrared light.

Then, the controller 103 estimates the sightline direction of the driver from a positional relation between pupils of the driver in the infrared image and an infrared illumination reflection image generated on eyeballs. Accordingly, the controller 103 may estimate the sightline direction with higher accuracy than a case in which no infrared image is used.

Description is referred back to FIG. 8. After estimating the field of view and the action of the driver in step S104, the controller 103 of the server device 100 superimposes the frame of view R1 and the action display area R3 on the vehicle exterior video V captured by the out-camera 11b (step S105).

The controller 103 further superimposes the object frame R2 on the vehicle exterior video V (step S106). Then, the controller 103 executes image processing for relatively increasing the visibility in the field of view (that is, in the frame of view R1) (step S107). The controller 103 executes the image processing such that the brightness and the transparency in the frame of view R1 are higher than those in the region other than the frame of view R1 of the vehicle exterior video V.

Then, the controller 103 repeats steps S104 to S107 for each frame image of the vehicle data in step S103 to generate a teaching material video (step S108).

Upon receiving a delivery request of the teaching material video (not shown) from the participating device 200, for example, the controller 103 delivers the teaching material video to the participating device 200 in response to the delivery request (step S109). Then, the controller 204 of the participating device 200 displays the received teaching material video on the HMI unit 201 (step S110). Accordingly, the participant may participate in e-learning such as safe driving guidance with a high learning effect using the teaching material video in which the actual field of view of the driver and the action of the driver are displayed together.

Figure 12:
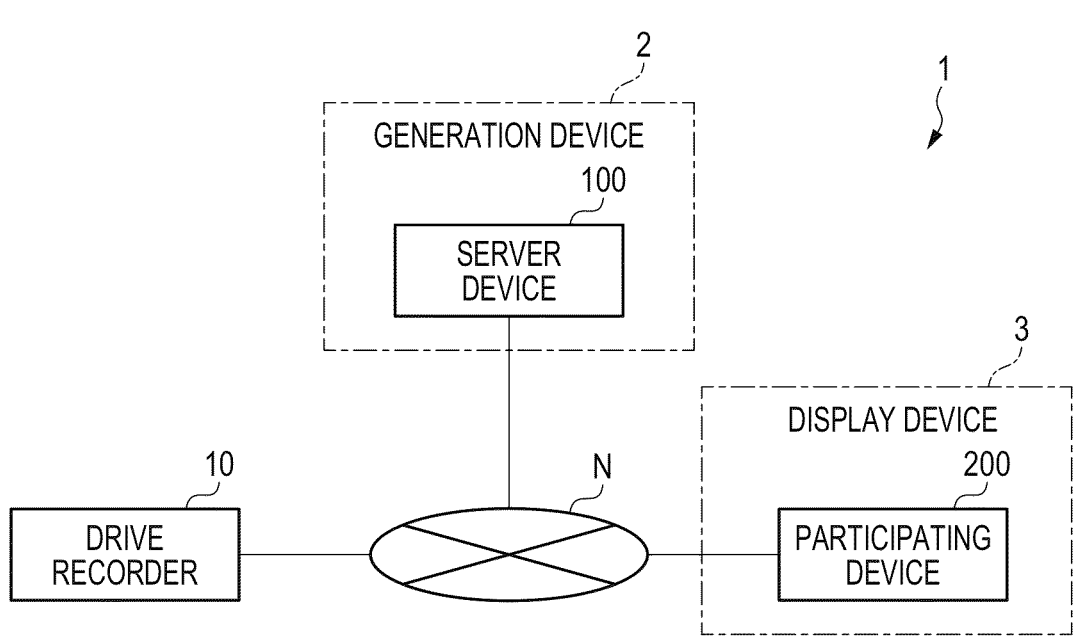
FIG. 12 is a supplementary diagram of the configuration example of the teaching material video generation system according to the embodiment.
Figure 13:
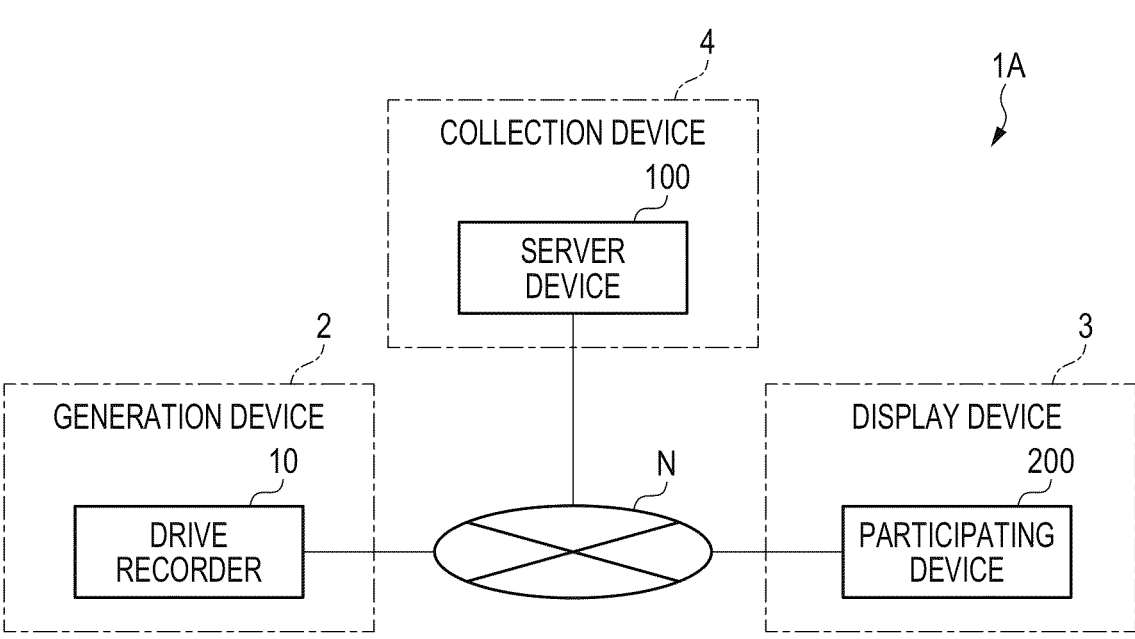
FIG. 13 shows a configuration example of a teaching material video generation system according to the first modification.
Figure 14:
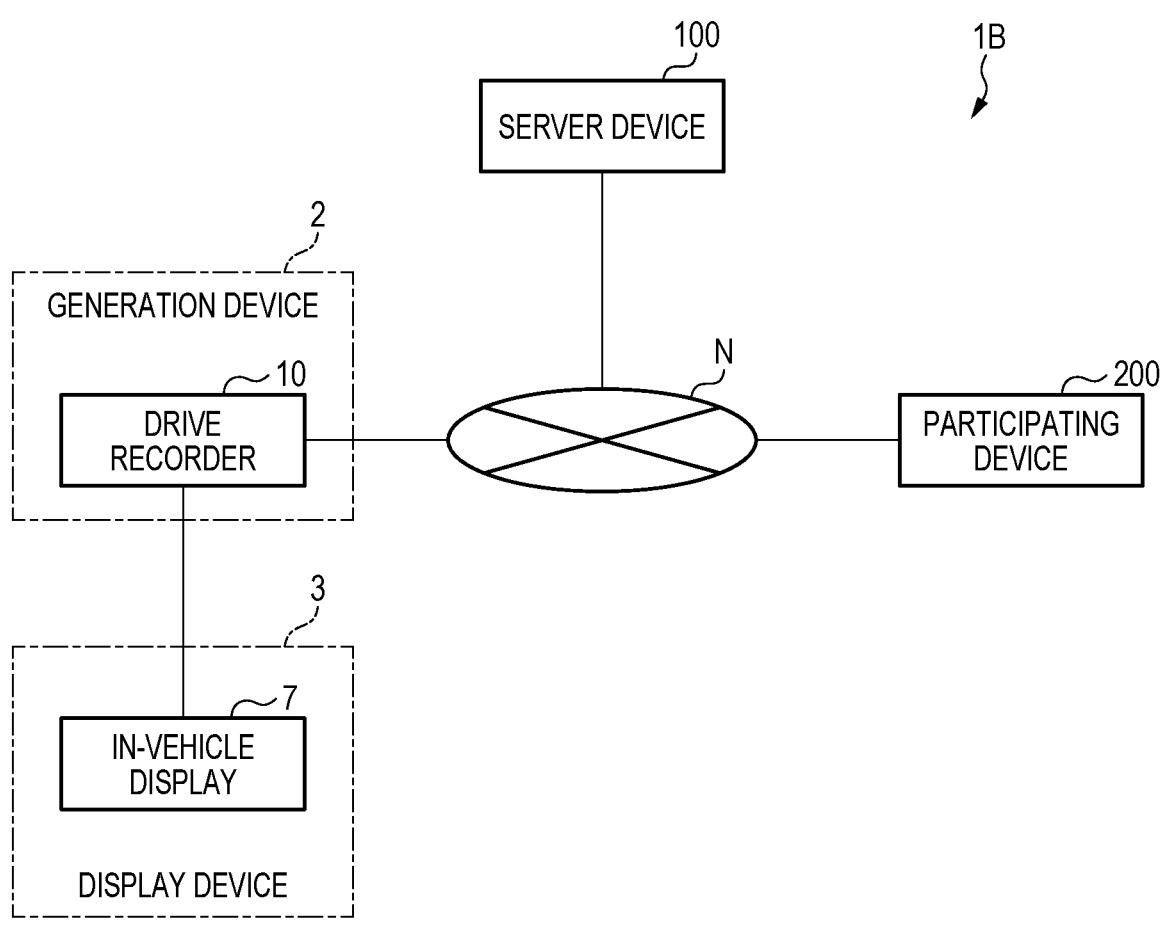
FIG. 14 shows a configuration example of a teaching material video generation system according to the second modification.

Next, FIG. 12 is a supplementary diagram of the configuration example of the teaching material video generation system 1 according to the embodiment. FIG. 13 shows a configuration example of a teaching material video generation system 1A according to the first modification. FIG. 14 shows a configuration example of a teaching material video generation system 1B according to the second modification.

In the example described above, as shown in FIG. 12, the server device 100 is the generation device 2 that generates a teaching material video according to the embodiment, and the participating device 200 is the display device 3 that displays the teaching material video according to the embodiment.

The configuration example shown in FIG. 12 is an example, and other modifications are possible. As shown in FIG. 13, in the teaching material video generation system 1A according to the first modification, the drive recorder 10 is the generation device 2, the participating device 200 is the display device 3, and the server device 100 is a collection device 4.

In this configuration example, the drive recorder 10 has a processing capability and function for generating a teaching material video similar to the server device 100 in the teaching material video generation system 1. In this configuration example, when detecting a specific event, the drive recorder 10 generates the teaching material video according to the embodiment based on vehicle data recorded therein. Then, the drive recorder 10 transmits the generated teaching material video to the server device 100 via the network N.

The server device 100 collects, accumulates, and manages the teaching material video transmitted from the drive recorder 10. Then, the server device 100 delivers the teaching material video to the participating device 200 in response to a delivery request from the participating device 200, for example. As in the case of the teaching material video generation system 1, the participating device 200 receives and displays the teaching material video delivered from the server device 100.

As shown in FIG. 14, in the teaching material video generation system 1B according to the second modification, the drive recorder 10 is the generation device 2, and an in-vehicle display 7 connected to the drive recorder 10 is the display device 3.

In this configuration example, the drive recorder 10 has the same processing capacity and function as that of the first modification. In this configuration example, when detecting a specific event, the drive recorder 10 generates the teaching material video according to the embodiment based on vehicle data recorded therein. Then, the drive recorder 10 displays the generated teaching material video on the in-vehicle display 7.

In this case, the drive recorder 10 may display the teaching material video related to the specific event detected by the drive recorder 10 on the in-vehicle display 7 with high immediacy. Accordingly, the driver may immediately grasp a cause or the like immediately after encountering, for example, a situation of a near-miss.

In the example of FIG. 14, the drive recorder 10 generates a verification video for a specific event detected by the drive recorder 10 rather than a teaching material video. In the present embodiment a case in which a teaching material video is generated is exemplified.

Alternatively, the generation device 2 may generate a verification video in addition to the teaching material video.

As described above, the generation method according to the embodiment is a generation method by the controller 103. The controller 103 acquires the vehicle interior video and the vehicle exterior video from the in-camera 11*a* and the out-camera 11*b* (corresponding to an example of the "camera"), executes an action analysis of the feature points of the face, the eyes, or the hand of the driver based on the vehicle interior video, and generates video data displaying the frame of view of the driver and the action of the driver together with the vehicle exterior video based on a result of the action analysis.

According to the generation method in the embodiment, since the frame of view of the driver and the action of the driver analyzed from the vehicle interior video are displayed together on the vehicle exterior video, the viewer of the vehicle exterior video may grasp the actual field of view of the driver and what led the driver to the field of view.

As described above, the participating device 200 (corresponding to an example of the "display device 3") according to the embodiment includes the HMI unit 201 (corresponding to an example of a "display unit") and the controller 204. The controller 204 acquires a video generated in a manner of displaying the frame of view of the driver and the action of the driver analyzed based on the vehicle interior video captured by the in-camera 11*a* together with the vehicle exterior video captured by the out-camera 11*b*. The controller 204 displays the video on the HMI unit 201.

According to the participating device 200 in the embodiment, since the frame of view of the driver and the action of the driver analyzed from the vehicle interior video are displayed together on the vehicle exterior video, the participant of the vehicle exterior video may grasp the actual field of view of the driver and what led the driver to the field of view.

Further effects and modifications may be easily derived by those skilled in the art. For this reason, broader aspects of the present invention are not limited to the specific details and the representative embodiment shown and described above. Therefore, various modifications may be made without departing from the spirit or scope of the general inventive concept defined by the appended claims and equivalents thereof.

What is claimed is:

1. A video data generation method executed by a controller, the generation method comprising:
    acquiring, by the controller, a vehicle interior video from an in-vehicle camera and a vehicle exterior video from an out-vehicle camera;
    estimating, by the controller, a position of a frame of view of a driver based on an orientation or a position of a face or an eye of the driver in the vehicle interior video;
    estimating, by the controller, a motion of the driver to an object based on a motion of a hand of the driver and the object that the hand of the driver touches in the vehicle interior video; and
    generating, by the controller, video data displaying the frame of view of the driver and text information or an icon indicating the motion of the driver to the object superimposed on the vehicle exterior video.

2. The video data generation method according to claim 1, wherein
    the motion of the driver to the object is an action that hinders safe driving or an action leading to a traffic violation.

3. The video data generation method according to claim 1, further comprising:
    detecting, by the controller, the face or the eye of the driver in the vehicle interior video by image recognition,
    extracting, by the controller, feature points of the detected face or the detected eye of the driver,
    estimating, by the controller, the orientation of the face or the eye of the driver based on positions of the feature points, and
    estimating, by the controller, the position of the frame of view of the driver in the vehicle exterior video based on the orientation of the face or the eye of the driver.

4. The video data generation method according to claim 1, further comprising:
    detecting, by the controller, an eye open state of the driver in the vehicle interior video, and
    estimating, by the controller, a size of the frame of view in the vehicle exterior video based on the eye open state of the driver.

5. The video data generation method according to claim 4, wherein
    the motion of the driver to the object is an action that hinders safe driving or an action leading to a traffic violation.

6. The video data generation method according to claim 1, further comprising:
    detecting, by the controller, the face of the driver in the vehicle interior video by image recognition,
    extracting, by the controller, feature points of the detected face of the driver,
    estimating, by the controller, a three-dimensional position and posture of the face of the driver based on the feature points,
    estimating, by the controller, a sightline direction of the driver as a three-dimensional vector corresponding to the position and the posture of the face of the driver, and
    estimating, by the controller, the position of the frame of view by projecting the sightline direction onto an imaging range of the vehicle exterior video.

7. The video data generation method according to claim 1, further comprising:

detecting, by the controller, the eye of the driver in the vehicle interior video by image recognition, extracting, by the controller, feature points of the detected eye of the driver, and determining, by the controller, whether the driver is dozing based on an eye open state of the driver estimated based on the feature points.

8. The video data generation method according to claim 1, further comprising:

estimating, by the controller, that the motion of the driver to the object is an operation while driving.

9. The video data generation method according to claim 1, further comprising:

detecting, by the controller, the face or the eye of the driver in the vehicle interior video by image recognition, extracting, by the controller, features points of the detected face or the detected eye of the driver, estimating, by the controller, the orientation of the face or the eye of the driver based on positions of the feature points, and determining, by the controller, whether the driver is looking aside based on the estimated orientation of the face or the eye of the driver.

10. The video data generation method according to claim 1, further comprising:

executing, by the controller, image processing for making visibility in the frame of view relatively higher than visibility in a region other than the frame of view of the vehicle exterior video.

11. The video data generation method according to claim 1, further comprising:

acquiring, by the controller, the vehicle interior video and the vehicle exterior video in response to a predetermined event being detected in relation to the vehicle, detecting, by the controller, an object in the vehicle exterior video, and generating, by the controller, the video data in which an object frame indicating the object is superimposed and displayed on the vehicle exterior video.

12. The video data generation method according to claim 1, wherein the video data is a teaching material video for e-learning.

13. A video data generation device comprising:

a controller configured to acquire a vehicle interior video from an in-vehicle camera and a vehicle exterior video from an out-vehicle camera, estimate a position of a frame of view of a driver based on an orientation of a face or an eye of the driver in the vehicle interior video, estimate a motion of the driver to an object based on a motion of a hand of the driver and the object that the hand of the driver touches in the vehicle interior video, and generate video data displaying the frame of view of the driver and text information or an icon indicating the motion of the driver to the object superimposed on the vehicle exterior video.

14. An image generation method executed by a controller, the method comprising:

acquiring, by the controller, a vehicle interior video from an in-vehicle camera and a vehicle exterior video from an out-vehicle camera;

determining, by the controller, a motion of a driver to an object in response to a motion of a hand of the driver and the object that the hand of the driver touches being detected in the vehicle interior video; and generating, by the controller, a composite image in which a text or graphic data indicating the motion of the driver to operate the object is superimposed on the vehicle exterior video.

* * * * *